Nov. 27, 1951
R. NELSON
2,576,235
LIFTER FOR HANDLING OBJECTS
Filed May 20, 1947
2 SHEETS—SHEET 2
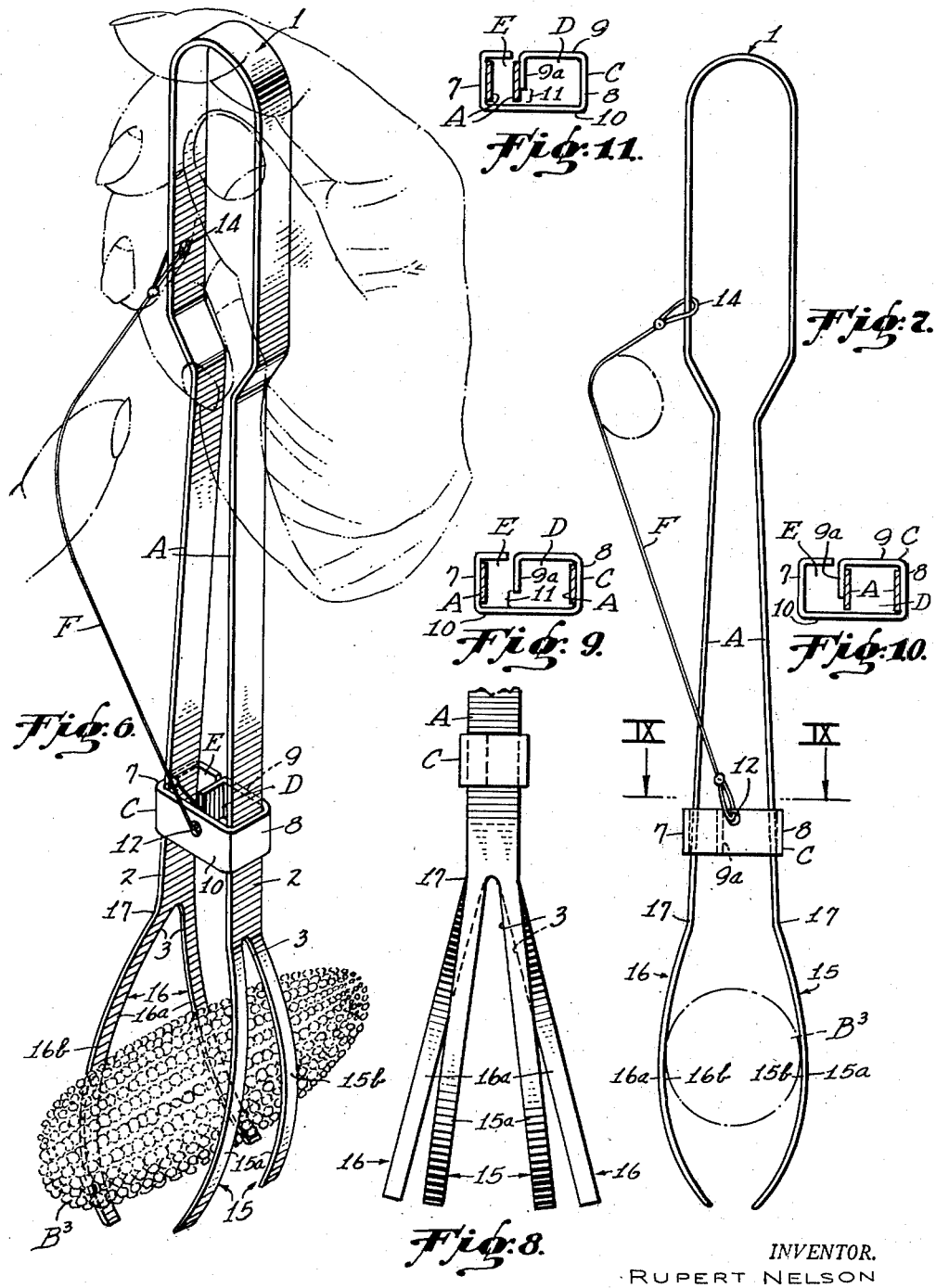
INVENTOR.
RUPERT NELSON
BY
Munn, Liddy & Glaccum
ATTORNEYS Patented Nov. 27, 1951

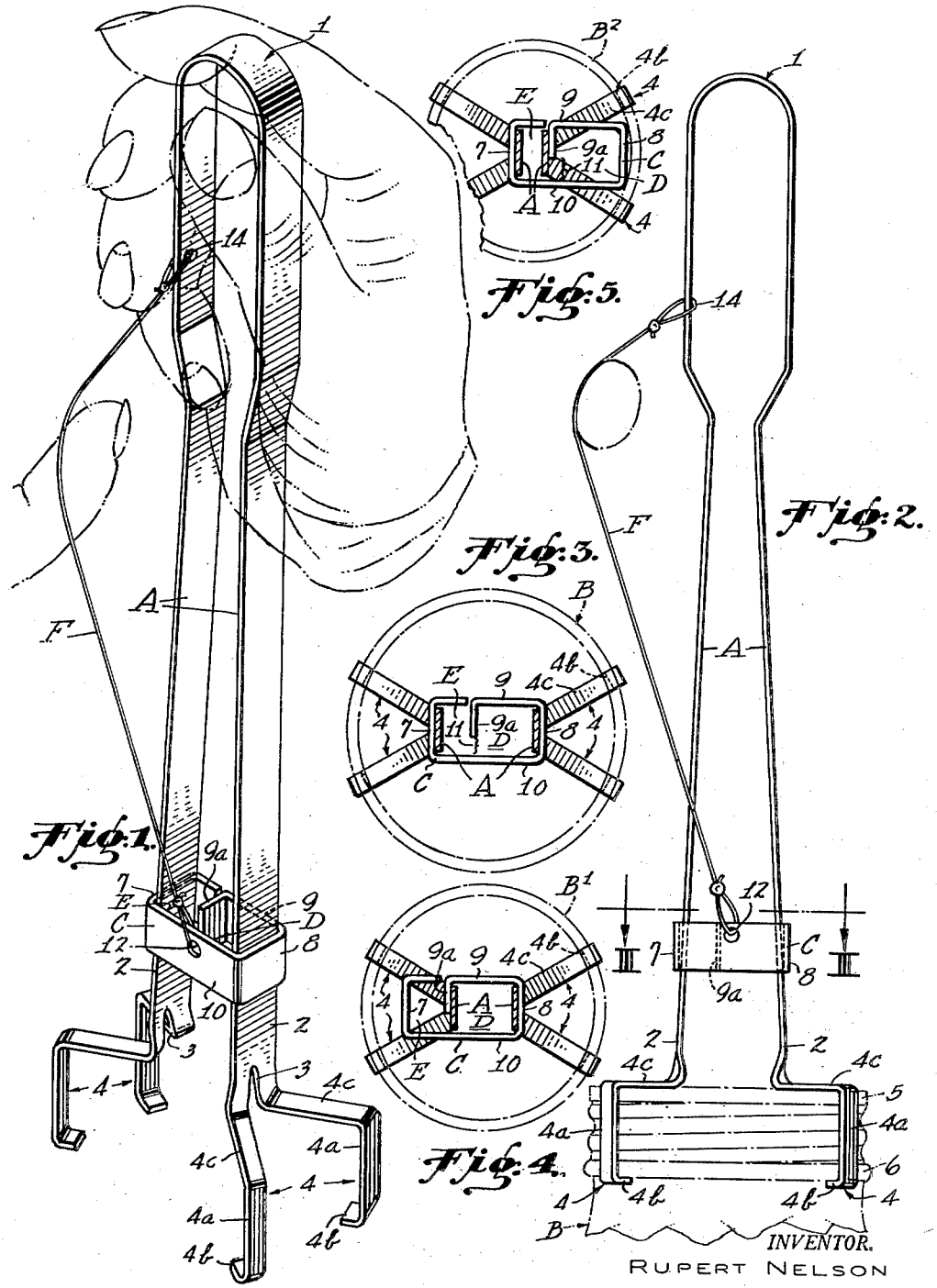

2,576,235

UNITED STATES PATENT OFFICE 2,576,235

LIFTER FOR HANDLING OBJECTS

Rupert Nelson, San Francisco, Calif., assignor of one-half to William W. Ickes, San Francisco, Calif.

Application May 20, 1947, Serial No. 749,260

2 Claims. (Cl. 294—33)

The present invention relates to improvements in lifters for handling objects, and more particularly to instruments for lowering an object into boiling water, or other heated zone, and/or removing hot objects therefrom. It consists of the combinations, constructions and arrangement of parts hereinafter described and claimed.

It is proposed in this invention to provide lifters that are adapted for handling cans, jars, or any other object that is to be placed in hot water or other heated zone, or removed therefrom, without danger of scalding or burning the hands of the user. For instance, in the canning of fruits and the like, it is necessary to place the preserving jars in boiling water for sterilizing them, and subsequently to remove the hot jars.

Although reference has been made to the canning of fruit or the like, it will appear evident as the specification proceeds that my lifter is also intended for handling other objects. For example, corn on the cob or frankfurters may be removed from vessels containing boiling water by employing my lifter. Also, various objects may be placed in hot ovens and barbecue pits, or removed, by grasping them with my lifter.

The primary purpose of my invention is to provide a lifter of the character described that may be utilized for firmly gripping the object to which it is applied, and allowing the grip to be readily released when the operator so desires. It is proposed to arrange the grip-releaser in such a manner that it may be operated from the upper part of the lifter, thereby relieving the user of any danger in being burned.

It is further proposed in this invention to provide a lifter that is adjustable in order to handle objects of various sizes.

Moreover, I propose to provide a lifter that is simple in construction, durable and efficient for the purpose intended, and which may be employed in a wide variety of uses.

Other advantages will appear as the specification continues, and the novel features will be set forth in the claims hereunto appended.

For a better understanding of my invention, reference should be had to the accompanying drawings, forming part of this application, in which:

Figure 1 is an isometric view of one of my lifters that is designed for handling jars and the like;

Figure 2 is a side elevation of the same lifter showing the latter applied to a jar;

Figure 3 is a horizontal sectional view taken along the line III—III of Figure 2;

Figure 4 is a view similar to Figure 3, but illustrating the slide adjusted for holding a smaller size of jar;

Figure 5 is another view similar to Figure 3, but discloses a still smaller jar being gripped by the lifter;

Figure 6 is an isometric view of a modified form of a lifter;

Figure 7 is a side elevation of the modified lifter;

Figure 8 is a fragmentary end elevation of the lower portion of the lifter shown in Figure 6;

Figure 9 is a horizontal sectional view taken along the line IX—IX of Figure 7;

Figure 10 is a view similar to Figure 9, but showing the slide adjusted for bringing the arms of the lifter closer together to grip a smaller object; and Figure 11 is another view similar to Figure 9, with the slide positioned to cause the gripper to engage a still further object.

While I have shown only the preferred forms of my invention, it should be understood that various changes or modifications may be made within the scope of the annexed claims without departing from the spirit thereof.

Referring now to the form of lifter shown in Figures 1 to 5, inclusive, it will be noted that I provide a pair of arms A that are formed from a single strip of resilient material. This strip is bent upon itself intermediate its ends to form a spring bow designated generally at 1. The arms are arranged in downwardly-diverging relation with one another, and the spring bow urges the lower ends 2 of the arms apart.

Each of the arms A has its lower end split lengthwise thereof, as at 3, and the split sections are spread apart to define gripping jaws indicated generally at 4. The jaws on one arm are arranged for coacting with the jaws on the other arm to grip an object B when the arms are pressed toward one another upon the interposed object.

In Figure 2, I disclose the interposed object as being a fruit jar having the usual lid 5 screwed thereon. An annular flange 6 extends around the neck of the jar immediately below the lid. Although I have described the jar somewhat in detail in order that one use of my lifter may be thoroughly understood, I desire to point out that other types of jars, cans, etc., may be handled with my lifter.

Each jaw 4 has a central portion 4a that is offset outwardly relative to its arm A, which is shaped for embracing the jar lid. The lower end of each jaw terminates in a foot 4b positioned to engage under the annular flange 6. The central portion 4a of each jaw is connected to the arm A carrying that jaw by a horizontally-disposed shoulder section 4c. When the lifter is moved endwise over the jar lid, the shoulders 4c limit downward movement of the arms A. The latter straddle the jar and its lid; and upon pressing the arms toward one another, the feet 4b move inwardly under the annular flange 6.

In order to hold the jaws 4 in gripping relation with the object B, I have provided a slide C on the arms A. As the slide is moved upwardly along the arms, the jaws 4 will move outwardly, thus freeing their grip on the interposed object. Upon pressing the resilient arms toward one another, the slide C will gravitate downwardly, and the slide will hold the jaws from moving out of gripping relation with the jar or other gripped object.

The slide C is substantially rectangular in outline. It includes opposite ends 7 and 8, and also opposing sides 9 and 10. The side 9 is formed with a finger 9a projecting toward the opposite side 10 of the rectangle, but spaced from the latter side. The finger 9a is disposed closer to the end 7 than to the end 8.

The end 8, finger 9a and sides 9 and 10 define a compartment D within the slide. Likewise, the end 7, finger 9a and sides 9 and 10 provide a second compartment E in the slide. Referring to Figures 3 to 5, inclusive, it will be seen that the compartment D is somewhat larger than the compartment E.

Figure 3 shows one of the arms A as being disposed in the compartment D, while the other arm A is arranged in the compartment E. With the arms thus disposed, the ends 7 and 8 of the slide bear against the arms. This arrangement will permit the relatively large object B to be gripped.

In the event that a smaller object B1 is to be gripped, both of the arms A are placed in the compartment D, as shown in Figure 4. When the arms A are pressed substantially flat together, the space 11 provided between the tip of the finger 9a and the side 10 will permit the arms to be shiftd edgewise from one compartment to the other. When gripping the smaller object B1, the end 8 and finger 9a bear against the arms A (see Figure 4).

In the event that a still smaller object B2 is to be handled, the arms A are shifted to the compartment E (see Figure 5). In this case, the end 7 and finger 9a will bear against the arms.

It should be noted that the finger 9a projects between the arms A and is arranged to strike against the spring bow 1 when the slide C is moved upwardly. This prevents disengagement of the slide over the top of the arms. Also the shoulders 4c limit the downward movement of the slide along the arms.

A flexible cord indicated at F is provided for moving the slide C upwardly along the arms A. The lower end of this cord is secured to the slide, as at 12, and its other end is anchored to an upper section of one of the arms, as at 14. The cord may be pulled for moving the slide upwardly and thereby allowing the jaws 4 to disengage themselves from the gripped object. The cord is operable well above the slide, and this is very desirable when hot objects are being handled with the lifter.

Turning now to the modified form shown in Figures 6 to 11, inclusive, it should be noted that the construction and operation of the slide and the arms of the lifter are identical with the first form. Like reference numerals have been applied to corresponding parts. The difference between the two forms lies in the particular shape of the gripping jaws, and this difference will be set forth below.

The gripping jaws are designated at 15 and 16 in the modification. These jaws are formed by splitting the lower ends 2 of the arms A lengthwise, as at 3, in the same manner as already mentioned. The tines 15a and 16a of these jaws, respectively, are spread apart to such an extent that the tines 15a will pass between the tines 16a as the arms A are pressed toward one another.

The central portions 15b and 16b of the tines 15a and 16a, respectively, are curved in the manner shown in Figures 6 and 7 so as to embrace the interposed object B3. The tips of the tines, which correspond to the feet 4b in the first embodiment, will fit underneath the object. The tines define shoulders 17 that limit the downward movement of the slide C on the arms A.

The lifter disclosed in Figures 6 to 11, inclusive, is very handy in removing objects from boiling water, for instance, corn on the cob, or frankfurthers, etc. Also, it may be utilized for removing hot objects from ovens, barbecue pits and the like. While I mention these uses by way of illustration, I do not wish to be confined thereto.

Having thus described the various parts of my lifters, the operation thereof is summarized as follows:

Referring first to the embodiment shown in Figures 1 to 6, inclusive, the operator grasps the upper ends of the arms A in one hand, as suggested in Figure 1. The jaws 4 are moved endwise over the jar or other object B until the feet 4b are in a position to engage underneath the annular flange 6. Next the arms A are pressed toward one another, which will result in the jaws grasping the interposed object. The slide C will gravitate downwardly so to hold the jaws in gripping relation with the object.

The lifter and the gripped object may be moved to a desired location, such as withdrawn from a kettle of boiling water and the object rested on a table. The operator uses the other hand to pull on the flexible cord F, thus elevating the slide C and allowing the jaws 4 to disengage themselves from the object.

One arm A may be disposed in each of the compartments D and E when a large object is to be handled, as shown in Figure 3. When a smaller object is to be lifted, both arms A are arranged in the compartment D (see Figure 4). A still smaller object may be handled by disposing both arms A in the compartment E, as suggested in Figure 5.

It should be noted that the four spaced-apart feet 4b will engage the gripped object at four different points. Different sizes of objects may be grasped and still there will be four points of contact between the lifter and the gripped object.

In using the modified form of lifter, as shown in Figures 6 to 11, inclusive, the operator grasps the upper parts of the resilient arms A in one hand, as suggested in Figure 6. The jaws 15 and 16 are arranged on opposing sides of the object B3 to be handled, and thereupon the arms are pressed toward each other so as to grip the object. The slide C will gravitate downwardly and will maintain the tines 15a and 16a in gripping relation with the object.

After the lifter and gripped object are moved to a location where the operator desires to release the object, the operator's other hand is used for pulling on the flexible cord F, thus moving the slide C upwardly and allowing the jaws 15 and 16 to separate and free the object.

I claim:

1. In a lifter of the character described; a pair of interconnected resilient arms having their lower ends yieldingly urged apart; the arms having jaws at their lower ends arranged to grip an object when the arms are pressed toward one another upon an interposed object; a slide encircling the arms and being moveable downwardly toward the jaws for maintaining the latter in gripping relation with the gripped object; the slide being substantially rectangular in outline; the slide having a finger projecting between the arms from one side of the rectangle toward the opposite side thereof, but spaced from the latter side; the finger and opposite ends of the rectangle defining compartments dimensioned to receive the arms; the arms being moveable from one compartment to the other through the space defined between the end of the finger and the side of the rectangle toward which the finger projects.

2. In a lifter of the character described; a pair of interconnected resilient arms having their lower ends yieldingly urged apart; the arms having jaws at their lower ends arranged to grip an object when the arms are pressed toward one another upon an interposed object; a slide encircling the arms and being moveable downwardly toward the jaws for maintaining the latter in gripping relation with the gripped object; the slide being substantially rectangular in outline; the slide having a finger projecting between the arms from one side of the rectangle toward the opposite side thereof, but spaced from the latter side; the finger and opposite ends of the rectangle defining compartments dimensioned to receive the arms; the arms being moveable from one compartment to the other through the space defined between the end of the finger and the side of the rectangle toward which the finger projects; the finger being disposed closer to one end of the rectangle than to the opposite end thereof.

RUPERT NELSON.

REFERENCES CITED

The following references are of record in the file of this patent:

UNITED STATES PATENTS

| Number | Name | Date |
| --- | --- | --- |
| 305,653 | Anthony | Sept. 23, 1884 |
| 515,162 | Parsons | Feb. 20, 1894 |
| 630,107 | Rayl | Aug. 1, 1899 |
| 1,538,536 | Wisoff | May 19, 1925 |
| 1,605,811 | Danielson | Nov. 2, 1926 |
| 1,703,112 | Kyser et al. | Feb. 26, 1929 |
| 1,775,571 | Romer | Sept. 9, 1930 |
| 1,800,781 | Dingle | Apr. 14, 1931 |
| 2,011,497 | Miller | Aug. 13, 1935 |